United States Patent
Talanov et al.

(10) Patent No.: US 6,856,140 B2
(45) Date of Patent: Feb. 15, 2005

(54) SYSTEM AND METHOD FOR QUANTITATIVE MEASUREMENTS OF A MATERIAL'S COMPLEX PERMITTIVITY WITH USE OF NEAR-FIELD MICROWAVE PROBES

(75) Inventors: Vladimir V. Talanov, Greenbelt, MD (US); Robert L. Moreland, Lothian, MD (US); Andrew R. Schwartz, Bethesda, MD (US); Hans M. Christen, Knoxville, TN (US)

(73) Assignee: Neocera, Inc., Beltsville, MD (US)

( * ) Notice: Subject to any disclaimer, the term of this patent is extended or adjusted under 35 U.S.C. 154(b) by 0 days.

(21) Appl. No.: 10/412,295

(22) Filed: Apr. 14, 2003

(65) Prior Publication Data

US 2004/0004484 A1 Jan. 8, 2004

Related U.S. Application Data

(63) Continuation-in-part of application No. 09/665,370, filed on Sep. 20, 2000, now Pat. No. 6,597,185.

(51) Int. Cl.$^7$ .............................................. G01R 27/04
(52) U.S. Cl. ...................................... 324/638; 324/637
(58) Field of Search ................................ 324/636, 637, 324/638, 642, 646, 71.1; 73/105

(56) References Cited

U.S. PATENT DOCUMENTS

| | | | |
|---|---|---|---|
| 5,502,392 A | 3/1996 | Arjavalingam et al. ...... 324/638 |
| 5,508,627 A | 4/1996 | Patterson ..................... 324/752 |
| 5,543,386 A | 8/1996 | Findikoglu et al. .......... 549/322 |
| 5,821,410 A | 10/1998 | Xiang et al. ................... 73/105 |
| 5,900,618 A | 5/1999 | Anlage et al. ............ 250/201.3 |
| 5,936,237 A | 8/1999 | Van Der Weide ........... 250/234 |
| 6,173,604 B1 * | 1/2001 | Xiang et al. ................... 73/105 |
| 6,285,811 B1 | 9/2001 | Aggarwal et al. ............. 385/31 |
| 6,597,185 B1 | 7/2003 | Talanov et al. .............. 324/638 |
| 2002/0153909 A1 | 10/2002 | Petersen et al. ............. 324/754 |

OTHER PUBLICATIONS

William R. Smythe, "Static and Dynamic Electricity", Third Edition, McGraw–Hill Book Company, NY. 1968, pp. 128–132, 227, No month's available.

M. Fee et al., "Scanning Electromagnetic Transmission Line Microscope With Sub–Wavelength Resolution" Optics Communications, vol. 69, No. 34, Jan. 1, 1989, pp. 219–224.

James Baker–Jarvis et al., "Analysis of an Open–Ended Coaxial Probe with Lift–Off for Nondestructive Testing", IEEE Transactions on Instrumentation and Measurement, vol. 43, No. 05, Oct. 1994, pp. 711–717.

(List continued on next page.)

*Primary Examiner*—Vincent Q. Nguyen
(74) *Attorney, Agent, or Firm*—Rosenberg, Klein & Lee

(57) ABSTRACT

A method for measuring a material's complex permittivity is provided where a near-field microwave probe is positioned a predetermined distance from a first and a second standard sample for measuring a relative resonant frequency shift of the near-field microwave probe for standard samples. Based on measurements, calibration coefficients are calculated. A relative resonant frequency shift of the near-field microwave probe for a sample under study is measured by fast frequency sweep technique while the distance between the tip of the probe and the sample under the study is maintained nominally at the distance between the tip of the probe and each standard sample during a calibration procedure by a shear-force based distance control mechanism. Also, the change in the quality factor of the probe for unloaded and loaded resonator is measured. The dielectric constant of the sample under study is calculated using the resonant frequency shift and the change in the quality factor of the near-field microwave probe for the sample under study and the calibration coefficients obtained during the calibration procedure.

21 Claims, 9 Drawing Sheets

OTHER PUBLICATIONS

D.E. Steinhauer et al., "Surface Resistance Imaging with a Scanning Near–Field Microwave Microscope", Applied Physics Letters, vol. 71, No. 12, Sep. 22, 1997, pp. 1736–1738.

Saeed Pilvar et al., "Focused Ion–Beam Fabrication of Fiber Probes with Well–Defined Apertures for Use in Near–Field Scanning Optical Microscopy", Applied Physics Letters, vol. 72, No. 24, Jun. 15, 1998, pp. 3133–3155.

Paul J. Petersan et al., "Measurement of Resonant Frequency and Quality Factor of Microwave Resonators: Comparison of Methods", Journal of Applied Physics, vol. 84, No. 06, Sep. 15, 1998, pp. 3392–3402.

C. Gao et al., "Quantitative Microwave Near–Field Microscopy of Dielectric Properties", Review of Scientific Instruments, vol. 69, No. 11, Nov. 1998, pp. 3846–3851.

Fred Duewer et al., "Tip–Sample Distance Feedback Control in a Scanning Evanescent Microwave Microscope", Applied Physics Letters, vol. 74, No. 18, May 3, 1999, pp. 2696–2698.

M. Tabib–Azar et al., "Nondestructive Superresolution Imaging of Defects and Nonuniformities In Metals, Semiconductors, Dielectrics, Composites, and Plants Using Evanescent Microwaves", Review of Scientific Instruments, vol. 70, No. 06, Jun. 1999, pp. 2783–2792.

Rimma Dekhter et al., "Investigationg Material and Functional Properties of Static Random Access Memories Using Cantilevered Glass Multiple–Wire Force–Sensing Thermal Probes", Applied Physics Letters, vol. 77, No. 26, Dec. 25, 2000, pp. 4425–4427.

* cited by examiner

SYSTEM AND METHOD FOR QUANTITATIVE MEASUREMENTS OF A MATERIAL'S COMPLEX PERMITTIVITY WITH USE OF NEAR-FIELD MICROWAVE PROBES

This Patent Application is a Continuation-in-Part (CIP) of a patent application Ser. No. 09/665,370, filed on Sep. 20, 2000 now U.S. Pat. No. 6,597,185.

FIELD OF THE INVENTION

The present invention relates to measurement techniques. In particular this invention directs itself to a technique for highly localized measurements of complex permittivity of materials using near-field microwave probes. The concept is based on a balanced two-conductor transmission line resonator which provides confinement of a probing field within a sharply defined sampling volume of the material under study to yield a localized determination of the material's complex permittivity.

More in particular, the present invention is directed to a method for quantitative measurement of a material's complex permittivity which does not require knowledge of probe geometry or the absolute distance from the tip of the probe to a sample under study.

The present invention is additionally directed to a distance control mechanism employed for quantitative measurements of a material's complex permittivity to maintain the same distance between the tip of the probe and the measured sample during both the calibration procedure and the actual measurements.

Further, the present invention relates to a technique for calibration of probes for quantitative measurements of a material's complex permittivity.

Still further, the present invention relates to determination of the resonant frequency of a microwave resonator probe which is an important parameter in the measurement of a material's complex permittivity.

BACKGROUND OF THE INVENTION

One of the main goals of the near-field scanning microwave microscopy is to quantitatively measure a material's complex microwave permittivity (dielectric constant and conductivity) with high sensitivity of lateral and/or depth selectivity (i.e. to determine the material's property over a small volume while ignoring the contribution of that volume's surrounding environment). This is particularly important in measurements on complex structures, such as semiconductor devices or composite materials, where, for example, the permittivity of one line or layer must be determined without having knowledge of the properties of the neighboring lines or underlying layers.

In order to perform highly localized quantitative measurements of a material's complex permittivity at microwave frequencies by means of near-field microwave microscopy the near-field probe requires calibration. All calibration procedures currently in use for near-field microwave microscopy employ some information about the actual tip geometry which would include, for example, the tip curvature radius, etc., and further requires knowledge of the absolute tip-to-sample separation as presented, for example, in C. Gao, et al., Rev. Scientific Instruments, 69, 3846, 1998.

If there is no radiation from the tip of the probe, the response of the electrical near-field probe depends on the fringe impedance of the tip $Z_t = 1/i\omega C_t$, where $C_t$ is the static capacitance of the tip of the probe. This capacitance depends on the physical geometry of the tip, the tip-to-sample separation d, and the sample's dielectric constant $\in_r$ (assuming the sample is uniform in shape). Thus, in order to extract the sample's dielectric constant $\in_r$ from the impedance of the tip $Z_t$, the tip geometry and absolute tip-to-sample separation must be known to a high degree of accuracy.

However, accurate determination of these parameters is difficult and often impractical, especially for very small tips of less than or on the order of a few microns in size which are of great importance for near-field microwave microscopy. Further, analytical solutions to the problem of interaction between a near-field tip and a sample exist only for the most simple tip geometries, such as a sphere or a flush end of a coaxial line (W. R. Smythe, Static and Dynamic Electricity, McGraw-Hill, NY, 1968; J. Baker-Javis, et al., IEEE Trans. Instrumentation and Measurement, 43, 711, 1994).

It is therefore highly desirable to perform quantitative measurement of a material's dielectric constant which does not require knowledge of either the actual tip geometry or the absolute tip-to-sample separation.

In microwave microscopy the basic measurement is a determination of the reflection of a microwave signal from a probe positioned in close proximity to a sample. Phase and amplitude of the reflected signal may be determined directly by using a vector network analyzer or by determination of the resonant frequency and quality factor of a resonator coupled to the probe.

Thus, determination of the resonant frequency and quality factor of a resonator coupled to the probe is extremely important to develop overall measurements of the material complex permittivity. The most conventional way of measuring the resonant frequency and quality factor of a microwave resonator is through analyzing the complex reflection ($S_{11}$) or transmission ($S_{21}$) coefficient of the resonator as a function of frequency measured with a vector network analyzer. A comprehensive review of such methods has been made by P. J. Peterson and S. M. Anlage in Journal of Applied Physics, 84, 3392, 1998. In particular, it has been found that the most precise and robust method is the phase vs. frequency fit, which provides precision in the resonant frequency about $1 \times 10^{-8}$ and approximately $3 \times 10^{-10}$ for the signal-to-noise ratios (SNR) ~49 and ~368, respectively when the data is averaged over 75 traces for a resonator with a Q-factor ~$10^6$.

Some applications involving the use of a resonator, require substantially precise simultaneous and fast measurements. This is important in scanning near-field microwave microscopy (NFMM) where the probe resonant frequency and Q-factor must often be quickly acquired during the scan. For most scanning applications, the desirable sampling time is on the order of or less than 1 second per point. Though precise, the methods described in Peterson, et al., are relatively slow, since the total averaging time is on the order of or greater than 10 seconds assuming that at least 100 ms is required by the vector network analyzer (NWA) to acquire a single S parameter vs. frequency trace. Moreover, it is likely that the resonant frequency is not going to be as stable as $10^{-8}$ or $10^{-10}$ during this period of time.

The existing methods for the resonant frequency and Q-factor measurements in the NFMM are generally deficient for the following reasons. Conventional $S_{11}$ or $S_{21}$ measurement using the NWA are slow. Amplitude measurement at a fixed frequency (M. Tabib-Azar, et al., Rev. Scientific Instruments 70, 2783, 1999) may be performed with the synthesized source, however, this method results in a convolution of the two resonator characteristics, such as resonant frequency and Q-factor. Frequency following techniques described in D. E. Steinhauer, et al., Applied Physics Letters, 71, 1736, 1997, are very fast (typical sampling rate is approximately 30 Hz), but neither precise nor accurate since the microwave source has to be used in the non-synthesized regime in order to lock a feedback loop. Distance following techniques described in F. Duewer, et al., Applied Physics Letters, 74, 2696, 1999, employ continuous adjustment of the probe-to-sample separation in a manner where the resonant frequency of the probe is maintained constant. Since this technique employs the synthesized source, it is fast and precise, however, the data obtained is generally a convolution of the sample topography and microwave properties.

Therefore, a novel approach to measurement of the resonant frequency, which is accurate, precise, and fast is needed to obtain a material's complex permittivity measurements with the use of near-field microwave probes.

A novel technique which permits performing measurements without knowledge of either the actual tip geometry or the absolute tip-to-sample separation to provide extra precise measurements of the frequency shift of the near-field probe is needed in the field of quantitative measurements of material's microwave properties.

SUMMARY OF THE INVENTION

An object of the present invention is to provide a technique for quantitative measurements of material's complex permittivity with near-field microwave probes which is independent of the actual geometry of the probe's tip and the absolute tip-to-sample separation.

It is another object of the present invention to provide a technique for quantitative material microwave measurements employing precise measurements of the frequency shift based on a fast frequency sweep (FFS).

It is a further object of the present invention to provide a method and apparatus for quantitative measurement of a material's complex permittivity with near-field microwave probes which employ an independent distant control mechanism for maintaining the tip of the probe at possibly unknown but nominally equal distance from the sample surface during both the calibration procedure and the actual measurement.

Further, it is an object of the present invention to provide an apparatus for highly accurate determination of the complex permittivity of a sample under study which employs a probe capable of sharply localized measurements which may be easily controlled for modification of sampling volume.

It is another object of the present invention to provide a technique for quantitative measurement of a material's complex permittivity in which the separation between the probe and the sample under study is carefully controlled by a shear force distance control mechanism. The motion of the probe tip is detected by an optical beam deflection technique for a piezo element or by a phase-or-amplitude-locked loop for a quartz tuning-fork oscillator (TFO), and a feedback loop maintains a constant motion of the probe tip at a value less than the predetermined threshold which permits precise distance control down to 1 nm.

It is a further object of the present invention to provide an algorithm for quantitative measurement of dielectric constants of a material using the shear-force based distance control mechanism, which includes:

adjusting the shear force distance control mechanism in a manner that it is capable of maintaining the tip of a probe at some fixed distance above the sample;

measuring the relative resonant frequency shift of the probe for at least two standard samples with known dielectric constants;

calculating the geometrical coefficients based on the measurement of relative resonant frequency shifts of the probe for at least two standard samples;

measuring the relative resonant frequency shift of the probe, using the fast frequency sweep (FFS) technique for the sample under study (it is important that during the measurements, the tip of the probe be maintained at nominally the same distance from the sample as during the calibration procedure for at least two standard samples);

measuring the change in the probe Q-factor, $\Delta(1/Q)=1/Q_e-1/Q$, where $Q_e$ and $Q$ are unloaded or loaded quality factors of the resonator, respectively;

extracting the dielectric constant of the sample under study using a predetermined formula; and extracting the dielectric loss tangent of the unknown sample using the measured change in the probe Q-factor.

In accordance with the principles thereof, the present invention is a method for quantitative measurement of a material's complex permittivity, which includes the steps of:

positioning a near-field microwave probe at a predetermined distance d* from a first standard sample, measuring a relative resonant frequency shift of the near-field microwave probe for the first standard sample, positioning the near-field microwave probe at the predetermined distance d* from at least one second standard sample, measuring a relative resonant frequency shift of the near-field microwave probe for the at least one second standard sample, calculating geometrical coefficients A and B using the measured relative resonant frequency and dielectric constants for the first and at least one second standard sample, positioning and maintaining the near-field microwave probe at the distance d* from a sample under study, measuring a relative resonant frequency shift of the near-field microwave probe for the sample under study, measuring the change in the probe Q-factor, $\Delta(1/Q)=1/Q_e-1/Q$, where $Q_e$ and $Q$ are quality factors of the empty resonator and the resonator loaded with a sample under study, respectively;

calculating the dielectric constant $\in_{rs}$ of the sample under study using the geometrical coefficients A and B as well as relative resonant frequency shift of the near-field microwave probe for the sample under study according to a predetermined formula; and extracting the dielectric loss tangent of the unknown sample using the measured change in the probe Q-factor.

The distance between the tip of the near-field microwave probe and the sample under study is maintained at a predetermined value by a shear force based distance control mechanism.

In the method of the present invention, measurements of the relative resonant frequency shift of the near-field probe for the sample under study is performed by a fast frequency sweep technique based on lock-in measurements of the absolute value of the first derivative of a power reflected from or transmitted through the sample under study as a function of frequency of a signal applied thereto.

The geometrical coefficients A and B are calculated as:

$$A[d^*] = \frac{-\delta f_1(\varepsilon_{r1}+1)^2(\varepsilon_{r2}-1)^2 + \delta f_2(\varepsilon_{r1}-1)^2(\varepsilon_{r2}+1)^2}{2(\varepsilon_{r1}-\varepsilon_{r2})(\varepsilon_{r1}-1)(\varepsilon_{r2}-1)}$$

$$B[d^*] = \frac{(\varepsilon_{r1}+1)(\varepsilon_{r2}+1)(\delta f_1(\varepsilon_{r1}+1)(\varepsilon_{r2}-1) - \delta f_2(\varepsilon_{r1}-1)(\varepsilon_{r2}+1))}{2(\varepsilon_{r1}-\varepsilon_{r2})(\varepsilon_{r1}-1)(\varepsilon_{r2}-1)}$$

where $\delta f_1 = (f_e - f_1)/f_e$ and $\delta f_2 = (f_e - f_2)/f_e$ are the relative frequency shifts for two standard samples, $\in_{r1}$ and $\in_{r2}$, respectively, measured at distance d*.

In the case where more than two standard samples are measured, A and B are determined by fitting the data to the following formula:

$$\delta f = \gamma A[d^*] + \gamma^2 B[d^*]$$

The dielectric constant $\in_{rs}$ of the sample under study is then calculated as:

$$\varepsilon_{rs} = \frac{\delta f_s + B[d^*] + \sqrt{A[d^*]^2 + 4\delta f_s B[d^*]}}{A[d^*] + B[d^*] - \delta f_s}$$

The dielectric loss tangent, tanδ, of the unknown sample is calculated using the formula:

$$\tan\delta = -\Delta\left(\frac{1}{Q}\right)\frac{(\varepsilon_{rs}+1)^3}{4\varepsilon_{rs}(2B[d^*](\varepsilon_{rs}-1) + A[d^*](\varepsilon_{rs}+1))}$$

Measurements of the Q-factors of the empty resonator and the resonator loaded with the sample under study to determine (Δ1/Q) are performed using the fast frequency sweep (FFS) technique.

Preferably the near-field microwave probe includes a balanced two conductor transmission line resonator.

For determining the relative resonant frequency, either of the following numerical techniques, singly or in combination may be used:

(a) determining the relative resonant frequency as the frequency at the point of the measured frequency curve wherein on the fitting curve of the measured power vs. frequency the frequency is a minimum; or (b) determining the relative resonant frequency as the frequency at the point of said measured curve where the first derivative of the measured power with respect to frequency equals zero and second derivative of the measured power is positive;

(c) fitting the obtained trace curve to an even order ($2^{nd}$ or nigher) polynomial, and finding the frequency where the first derivative of this polynomial equals to zero; and (d) fitting the measured curve to the equation $$R(f) = G\left\{\left[2\pi b + 8\pi^2 c(f - f_{res}) + \frac{32\beta(f - f_{res})f_{res}^2 Q^2}{(1+\beta)^2(f_{res}^2 + 4(f - f_{res})^2 Q^2)^2}\right]^2\right\}^{1/2},$$

and, finding $f_{res}$ as the free fit parameter, wherein:
R(f) is the magnitude of the measured signal;
G is the total gain in the resonator;
b and c are polynomial coefficients;

β is the coupling coefficient; and
Q Is the loaded Q-factor.

The present invention also is directed to an apparatus for measuring a material's complex permittivity, including:
a sample under study,
a near-field microwave probe having a tip,
a shear force based distance control unit operatively coupled to the near-field microwave probe to control tip-to-sample separation, and
processing means for calculating the complex permittivity of the sample under study.

The apparatus further includes a calibration mechanism which includes:
at least two standard samples, for measuring the relative resonant frequency shifts with respect to each standard sample when the separation between the tip of the probe and the sample is maintained at a predetermined value, and
processing means for calculating the calibration coefficients A and B in accordance with a predetermined formula.

In the apparatus for material's complex permittivity measurement, the means for measuring a relative resonant frequency shift of the near-field microwave probe for the sample under study, as well as for the standard samples, is a unit for lock-in based measurement of the absolute value of the first derivative of the power reflected from or transmitted through the sample as a function of the frequency of the signal applied to the probe.

The shear force based distance control unit includes:
an oscillating unit attached to the probe to excite oscillations in the tip of the probe,
a stage operatively coupled to the probe,
a laser generating a laser beam directed to the tip of the probe,
a photodetector receiving the laser beam affected by the oscillations of the tip of the probe with the photodetector outputting a signal corresponding to changes of the oscillation parameters of the tip of the probe,
a lock-in amplifier receiving the signal from the photodetector where the lock-in amplifier generates an oscillation output signal and a control output signal responsive to the signal from the photodetector, the oscillation output is fed to an oscillating unit, and the control output signal of the lock-in amplifier is fed to the stage to move the same in a predetermined direction to control the tip-to-sample separation.

These and other novel features and advantages of this invention will be fully understood from the following detailed description of the accompanying Drawings.

DESCRIPTION OF THE PREFERRED EMBODIMENT

Figure 1:
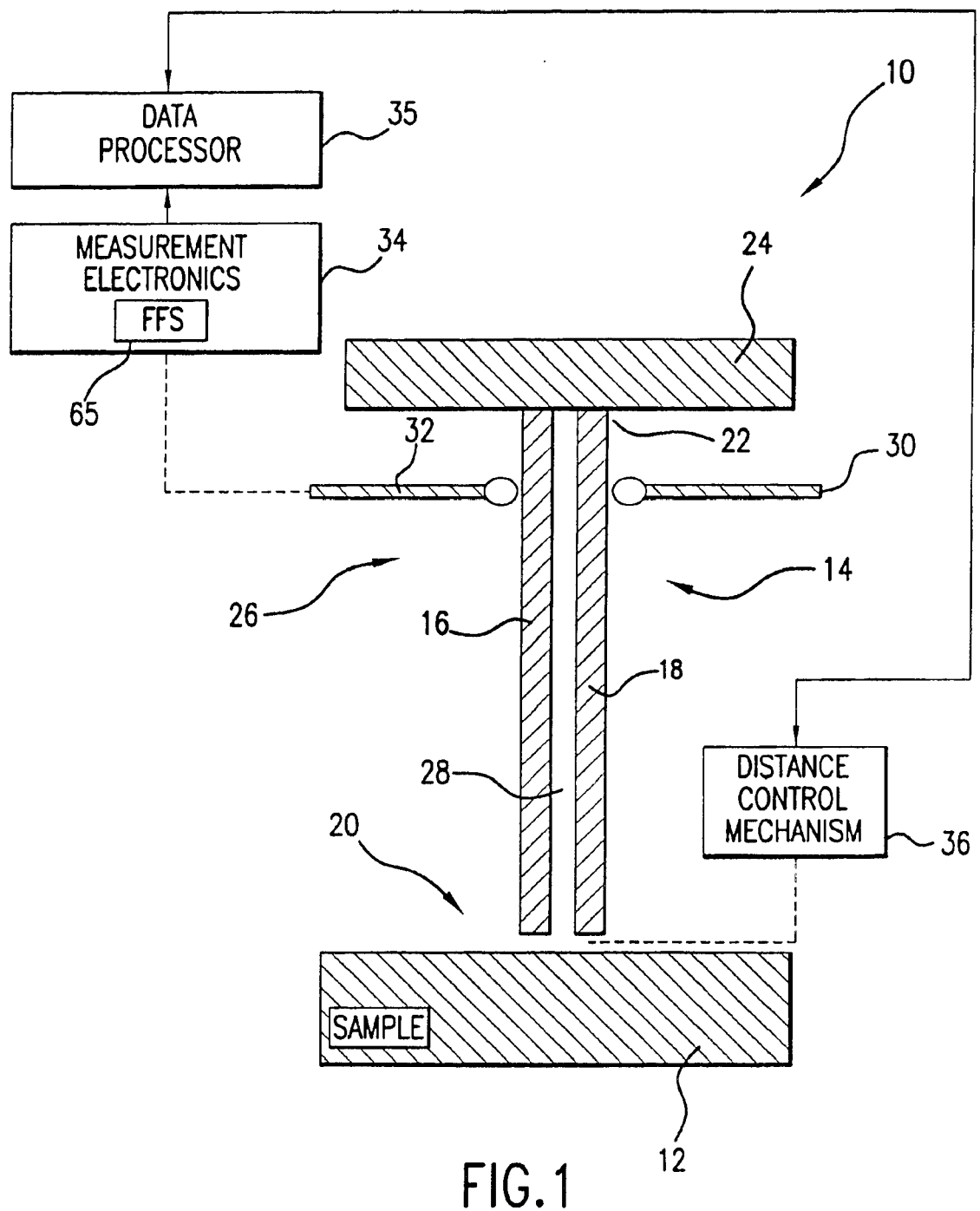
FIG. 1 schematically depicts a two conductor transmission line resonator with a probing end used for quantitative measurement of a material's complex permittivity of the present invention.

Referring to FIG. 1, there is shown a probe 10 for non-destructive determination of the complex permittivity of a sample 12 which is based on a balanced two conductor transmission line 14 which includes two spatially separated symmetrically arranged electrical conductors 16 and 18 of cylindrical, semi-cylindrical, rectangular, or similar type cross-section contour. The conductors may be formed out of copper, tungsten STM tips, gold, silver, or aluminum strips deposited onto a glass fiber as will be detailed in following paragraphs. A probing end 20 of the transmission line 14 is brought in close proximity to the sample 12 and an opposite end 22 of the transmission line 14 is either connected to electronics for the determination of a reflected signal's phase and magnitude, or to a terminating plate 24 to form a resonator structure 26 for the purposes described in the following paragraphs.

The probe 10 is primarily envisioned in two embodiments:

A. In operation as a transmission line for feeding a signal to the sample 12 and measuring the phase and magnitude of the reflected signal. This transmission line is operated either in the odd mode, i.e., in a mode in which the current flow in one of the two conductors 16, 18 is opposite in direction to that in the other conductor; or in an even mode if a conducting sheath is used for enveloping the transmission line 14. In this embodiment, the behavior of the transmission line 14 is analogous to the case of symmetrically coupled microstrip lines within an enclosure. When operated in the even mode, the interaction between the sample and the probe is similar to the coaxial symmetries known to those skilled in the art. Measurements of the phase and magnitude of the reflected signal by means of the transmission line arrangement are broadband in frequency but are generally not satisfactory with respect to sensitivity to the sample properties and require additional expensive and complex electronic equipment such as vector network analyzers.

B. In order to obtain a more sensitive and accurate result while employing less expensive equipment, the probe 10 of the present invention is envisioned as a resonator structure 26 which is formed by a portion of the transmission line 14 with the conductors 16, 18 separated by a dielectric medium. The dielectric medium 28 may include air, a circulating fluid for temperature stabilization, or high dielectric constant materials for size reduction.

The probing end 20 of the resonator structure 26 is brought into proximity to the sample 12 (which can be ion-implanted silicon, metals, dielectric, metal films, or dielectric films on any substrate) with the opposite end 22 of the transmission line resonator structure 26 being coupled to the terminating plate 24, as best shown in FIG. 1. The resonator structure 26 is formed in order to measure the resonant frequency and quality factor of the resonator structure 26 for determination of the complex permittivity of the sample 12.

The spacing between the two conductors 16, 18 and their cross-section must be properly chosen in order to maintain a resonator quality factor Q high enough for accurate measurements of the sample induced changes in the resonant frequency and the Q factor. For instance, the spacing between the conductors 16 and 18 may be on the order of or greater than 1 mm for Q>1000 at 10 GHz.

When the probe 10 of the present invention is operated as the resonator, the odd and even modes of operation in general result in two different resonant frequencies due to dispersion of the signal and can therefore be separated in the frequency domain, powered as well as monitored independently. The dielectric medium 28 sandwiched between the conductors 16 and 18 serves to enhance such dispersion.

The coupling to the resonator 26 is accomplished by a coupling loop 30 positioned close to the resonator 26 and internal to an optional conducting sheath (not shown). An optional second coupling loop 32 may be used for the measurement electronics 34 schematically shown in FIG. 1. Alternatively, a circulator or directional coupler may be used to separate the signal reflected from the resonator 26 back to the feed loop 30. The resonant frequency and quality factor of the resonator structure 26 is determined by Fast Frequency Sweep (FFS) apparatus 65 of the present invention further disclosed in following paragraphs.

All calculations are carried out by data processing means 35 based on predetermined formulas applied to the measured data. The processing means 35 additionally controls the overall performance and operation of the measurement electronics 34, as well as distance control mechanism 36.

The resonator structure 26 forms a $(2n+1)\lambda/4$ or $(n+1)\lambda/2$ or resonator (n=0, 1, 2, ...), and its length is determined by the frequency of the lowest mode, e.g., about 7.5 mm for the $\lambda/2$ mode operating at 10 GHz.

The resonator structure 26 may be enclosed in a cylindrical sheath formed of a highly conductive material (Cu, Au, Ag, Al). The sheath eliminates both radiation from the resonator 26 and the effect of the probe environment on the resonator characteristics. In particular, the changing influence of moving parts in the proximity of the resonator 26 is eliminated. Additionally, the sheath has an opening near the sample area, allows for an efficient coupling of the sample 12 to the resonator 26 and thus permits the resonant frequency and Q factor to be dependent on the sample microwave permittivity. In situations where the spacing between the conductors 16 and 18 is small in comparison to the inner diameter of the sheath, the resonator properties are substantially unaffected by the sheath presence. The upper part of the sheath makes electrical contact with the terminating plate 24. The bottom part of the sheath may have a conical shape in order to provide clear physical and visual access to the sampling area.

As discussed in previous paragraphs, the probing end 20 of the resonator structure 26 is brought into close proximity to the sample 12 for measurement purposes. The geometry of the probing end (tip) 20, as well as the separation between the tip 20 and the sample 12 present information vital to calibration procedures used for near-field microwave microscopy for quantitative measurements of a material's complex permittivity. Since the accurate determination of these parameters is difficult and often impractical, especially for the very small tips of less than or on the order of a few microns in size of the transmission line 14 shown in FIG. 1, the quantitative measurement of material's complex permittivity (dielectric constant of the material) is performed without any knowledge of either the actual tip geometry or the absolute tip-to-sample separation by means of employing an independent distance control mechanism 36, schematically shown in FIG. 1 and further shown in detail in FIG. 2.

The distance control mechanism 36 of the present invention is a shear-force based distance control mechanism by means of which the tip 20 of the resonant structure 26 is maintained at an unknown, but nominally the same or equal distance from the sample surface during both the calibration procedure and the actual measurement process. Combined with the appropriate theory describing the probe-to-sample interaction in terms of solely the problem geometry, the distance control mechanism of the present invention yields accurate quantitative results.

Figure 2:
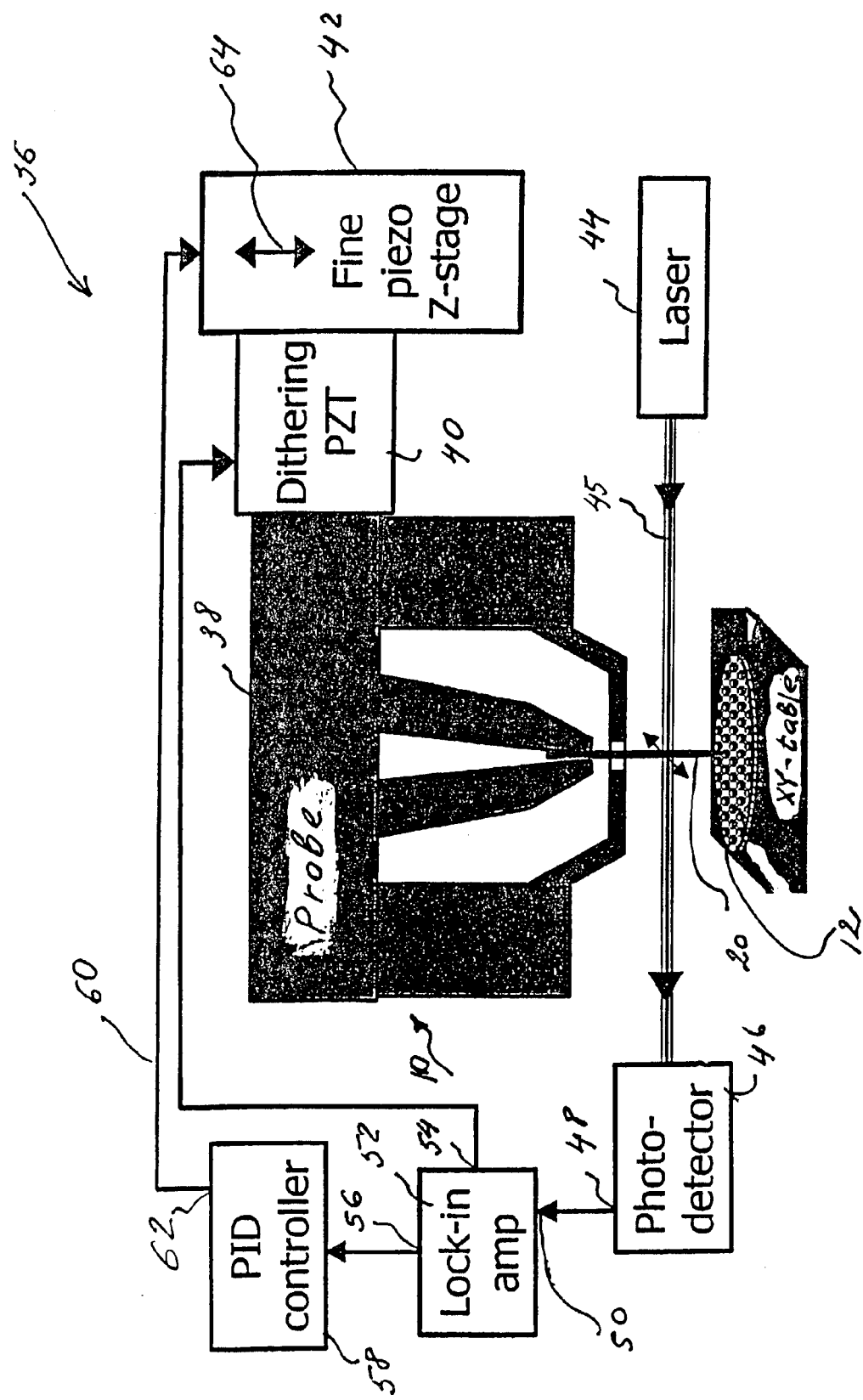
FIG. 2 represents schematically a shear-force distance control mechanism of the present invention.

In order to perform quantitative measurements with near-field microwave probes, shown in FIG. 1, it is essential that the separation between the probe tip 20 and the sample under study 12 be precisely controlled. Without precise control of this distance, changes in sample properties (permittivity) cannot be distinguished from changes in such a distance. To control the distance between the tip 20 and the sample 12, the distance control unit 36, shown in FIG. 2, is incorporated into the measurement scheme of the probe shown in FIG. 1. The distance control unit 36 is coupled bi-directionally to the data processor 35 for data exchange between them and for control over the operation of the distance control mechanism 36.

Shear force based distance control mechanism 36 is a distance control mechanism applicable for use in near-field scanning optical microscopy (NSOM). The basic concept of the shear force distance control mechanism is that a probe, specifically the tip 20, is flexible and is mounted onto and dithered by a piezoelectric element or a quartz tuning-fork oscillator (TFO) with an amplitude from a few nanometers down to a few angstroms. As the tip of such a probe is brought into close proximity to the sample surface 12, the amplitude of the tip oscillations is damped by interactions between the tip 20 and the sample surface 12. The motion of the tip is detected by an optical beam deflection technique for the piezo element or by a phase-or-amplitude-locked loop for the tuning fork oscillator (TFO).

In the measuring technique of the present invention, as shown in FIG. 2, a housing 38 of the microwave probe (resonator) 26 is attached to the dithering element (piezoelectric) 40, which, in turn, is supported by a fine piezo stage 42. Thus, the tip 20 is dithered by the piezoelectric element 40 with an amplitude ranging from a few nanometers down to a few angstroms.

The motion of the tip 20 is detected by an optical beam deflection unit which includes a laser 44 generating a laser beam 45 directed via the oscillating tip 20 to a photodetector 46. As the tip 20 is brought into close proximity to the sample surface 12, the amplitude of the tip oscillations is changed, i.e., damped, by interactions between the tip 20 and the sample surface 12 which is detected by the photodetector.

Responsive to the change of the amplitude of the tip oscillations, the photodetector 46 generates at an output 48 which is a signal indicative of the change in tip-to-sample separation. The signal from the output 48 of the photodetector 46 is supplied to an input 50 of a lock-in amplifier 52, responsively generating an output signal. The generated signal is fed from an oscillator output 54 of the lock-in amplifier 52 to the dithering element 40 for maintaining the generation of oscillations thereat.

Simultaneously, the lock-in amplifier 52 generates at an output 56 which is a control signal indicative of unwanted changes in the separation between the tip 20 and the sample 12. This control signal is fed from the output 56 of the lock-in amplifier 52 to a PID (Proportional Integral Derivative) controller 58 which generates in response thereto a control signal 60 output from an output 62 of the PID controller 58. The control signal 60 is fed to the fine piezo Z-stage 42 for changing the position thereof along the direction shown by the arrow 64, in order that the probe attached to the fine piezo Z-stage 42, through the dithering element 40, will adjust its position with respect to the sample 12 in order to reach a predetermined separation between the tip 20 and the sample 12.

The photodetector 46, the lock-in amplifier 52, the PID controller 58, and the fine piezo Z stage 42, in combination with the laser 44 form a feedback loop which maintains the amplitude of the oscillations of the tip 20 of the probe fixed at a value less than a predetermined maximum amplitude of oscillations, and thus, permits precise distance control down to 1 nm.

The height of the tip over the samples, at which the distance control may be performed, is a function of the amplitude of the tip oscillation, where the smaller the amplitude of oscillations, the smaller the distance attained.

In the apparatus of the present invention, the successful integration of the shear force distance control mechanism 36 with both coaxial probes (on the order of 100 microns) and with dielectric wire-based probes (with apertures down to 1 micron) are attainable with an achieved precision down to 2 nm. Such a precise distance control between the tip 20 and the sample 12 during the measurements of the complex permittivity of the material of the sample 12 is a critical part of the measurement process of the present invention since the distance between the tip 20 and the sample 12 is to be maintained at substantially the same distance during the measurement procedure as was achieved during the calibration procedure.

To perform quantitative measurements of dielectric constant (complex permittivity) of the material of the sample 12 using the shear force based distance control mechanism 36, the following procedures are performed:

(a) Adjust the shear force distance control mechanism 36 in a manner that it is capable of holding the tip 20 at some fixed distance d* above the sample 12. Generally, the absolute value of this distance d* is not known. However, it could be estimated by measuring the shear force signal (the signal at the output 48 of the photodetector 46, shown in FIG. 2) as a function of the tip-to-sample separation by means of the tip 20 approaching the sample 12 in the open-loop circuitry. It is preferred to maintain the separation d* on the order of or less than 1/10 of the dimensions of the tip 20.

(b) Measure the relative resonant frequency shifts of the probe $\delta f_1 = (f_e - f_1)/f_e$ and $\delta f_2 = (f_e - f_2)/f_e$, for at least two standard samples with known dielectric constants $\in_{r1}$ and $\in_{r2}$ ($\in_{r1} \neq \in_{r2} \neq 1$), wherein $f_1$ and $f_2$ are the resonant frequencies measured at some fixed tip-to-sample separation d*, and $f_e$ is the resonant frequency of the empty resonator (e.g. the sample is air or vacuum with $\in_r=1$). It is preferred to have the values $\in_{r1}$ and $\in_{r2}$ in the range of expected dielectric constant of the sample under study. For example, if the sample 12 has dielectric constant in the range from 1 to 10, then Teflon ($\in_{r1}=2$) and MgO ($\in_{r2}=9.8$) may be used as the standard samples. To improve the calibration accuracy, $\in_{r1}$ and $\in_{r2}$ should not differ by more than a factor of 10.

(c) If only two standard samples are used then the geometrical coefficients A and B (disclosed in the following paragraphs) can be calculated using the following formulas ($\in_{r2}>\in_{r1}$):

$$A[d^*] = \frac{-\delta f_1(\varepsilon_{r1}+1)^2(\varepsilon_{r2}-1)^2 + \delta f_2(\varepsilon_{r1}-1)^2(\varepsilon_{r2}+1)^2}{2(\varepsilon_{r1}-\varepsilon_{r2})(\varepsilon_{r1}-1)(\varepsilon_{r2}-1)}$$

$$B[d^*] = \frac{(\varepsilon_{r1}+1)(\varepsilon_{r2}+1)(\delta f_1(\varepsilon_{r1}+1)(\varepsilon_{r2}-1) - \delta f_2(\varepsilon_{r1}-1)(\varepsilon_{r2}+1))}{2(\varepsilon_{r1}-\varepsilon_{r2})(\varepsilon_{r1}-1)(\varepsilon_{r2}-1)}$$

In the case where more than two samples are available, the result of the calibration procedure $\{(\in_{re}=1, \delta f_e=0), (\in_{r1}, \delta f_1), (\in_{r2}, \delta f_2), \ldots\}$ must be fit to the following formula:

$$\delta f = \gamma A[d^*] + \gamma^2 B[d^*]$$

where $\gamma=(\in_r-1)/(\in_r+1)$, and $A[d^*]$ and $B[d^*]$ are the two fitting parameters to be determined during the calibration procedure.

(d) Measure the relative resonant frequency shift of the probe, $\delta f_s[d^*]=(f_e-f_s[d^*])/f_e$ for the sample under study (using the FFS routine described in detail infra). It is required that, by means of the distance control mechanism 36, the tip 20 is maintained at nominally the same distance d* from the sample 12 as was maintained during the calibration procedure.

(e) Measure the change in the probe Q-factor, $\Delta(1/Q)=1/Q_e-1Q$, where $Q_e$ and Q could be either loaded or unloaded quality factors of the resonator.

(f) Extract the dielectric constant, $\in_{rs}$, of the sample 12 using the following formula:

$$\varepsilon_{rs} = \frac{\delta f_s + B[d^*] + \sqrt{A[d^*]^2 + 4\delta f_s B[d^*]}}{A[d^*] + B[d^*] - \delta f_s}$$

(g) Extract the dielectric loss tangent, $\tan \delta$, of the unknown sample using the following formula:

$$\tan\delta = -\Delta\left(\frac{1}{Q}\right)\frac{(\varepsilon_{rs}+1)^3}{4\varepsilon_{rs}(2B[d^*](\varepsilon_{rs}-1) + A[d^*](\varepsilon_{rs}+1))}$$

Figure 3:
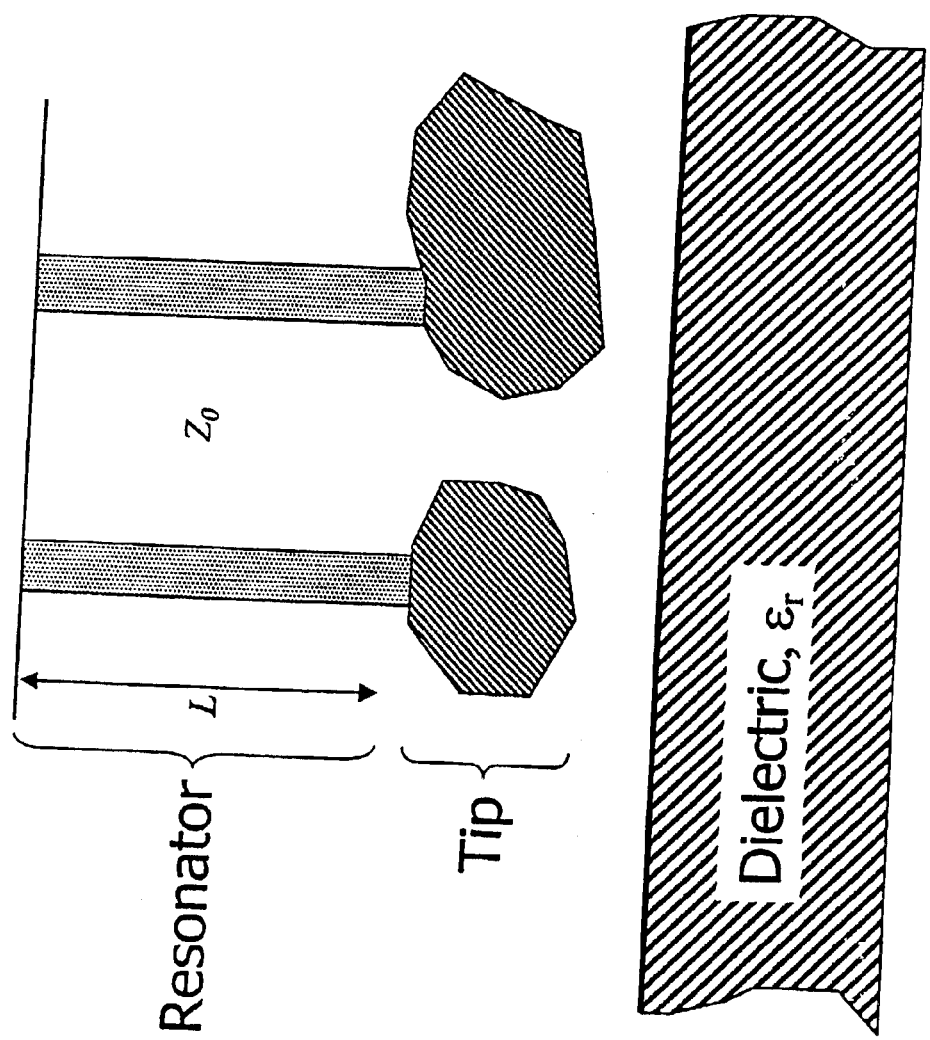
FIG. 3 is a schematic representation of the tip formed by two conductors of arbitrary shape which is attached to the microwave transmission line resonator.

Such a novel method of measuring the complex permittivity (the dielectric constant $\in_{rs}$ of the material of the sample 12) is based on the theory describing the probe-to-sample interaction developed by the Applicant. As shown in FIG. 3, the most common geometry of the near-field microwave probe 10 is illustrated comprising the tip 20 formed by two conductors 16 and 18 of arbitrary shape. The probe 10 is attached to the microwave transmission line or lumped element resonator 26 and the tip 20 is placed in vacuum above the semi-infinite dielectric sample with permittivity $\in_r$. Generally, the space between the two tip conductors can be filled with dielectric. The mutual fringe capacitance $C_t$ between the two tip conductors 16 and 18 in the presence of the dielectric sample 12 (assuming that the tip size is much less than the radiation wavelength and therefore that a static approach is sufficient) is to be found.

In the theory of the probe-to-sample interaction, the z-axis is assumed to be perpendicular to the dielectric surface with the origin on it. We place charges +1 and −1 on the first and the second conductors 16 and 18 of the tip 20, respectively. The charges will produce some surface charge density $\sigma_e$. The electrical potential in vacuum due to this surface density without the sample present will be $V_e=f_e[x,y,z]$. If the dielectric sample 12 is brought underneath the tip 20 the new surface charge density will be $\sigma$. The potential V in a vacuum space above the sample due to $\sigma$ can be represented as follows [see W. R. Smythe, *Static and Dynamic Electricity*, McGraw-Hill, NY, 1968]:

$$V=p[x,y,z]+\gamma p[x,y,-z]$$

$$\gamma=(\in-1)/(\in+1) \qquad (1)$$

where $p[x,y,z]$ is the potential in vacuum due to the surface density $\sigma$ with no dielectric present. Generally, $\sigma_e$ and $\sigma$ are different, and therefore $p_e[x,y,z]$ and $p[x,y,z]$ are correspondingly different. However, if the tip-to-sample separation is not too small and sample dielectric constant is not too large then the difference between $p_e[x,y,z]$ and $p[x,y,z]$ will be relatively small. Therefore, for a given problem geometry one can expand:

$$p[x,y,z,\gamma]=p_e[x,y,z]+\gamma P[x,y,z] \qquad (2)$$

where $$P[x,y,z] = \frac{\delta p[x,y,z,\gamma]}{\delta \gamma}\bigg|_{\gamma=0}$$

Substitution of Eq. (2) into Eq. (1) yields:

$$V[x,y,z]=p_e[x,y,z]+\gamma(P[x,y,z]+p_e[x,y,-z])+\gamma^2 P[x,y,-z]] \qquad (3)$$

The mutual capacitance $C_t$ between the two tip conductors is given by:

$$(C_t)^{-1}=V_2-V_1 \qquad (4)$$

where $V_1=V[x_1,y_1,z_1]$, $V_2=V[x_2,y_2,z_2]$, and $(x_1,y_1,z_1)$ and $(x_2,y_2,z_2)$ are the two points located on the surface of the first and the second capacitors, 16 and 18, respectively. Substitution of Eq. (3) into Eq. (4) yields for the tip capacitance:

$$\frac{1}{C_t} = \frac{1}{C_{t0}} + \gamma A' + \gamma^2 B' \qquad (5)$$

The two coefficients describing the problem geometry are:

$$A'=p_e[x_2,y_2,-z_2]-p_e[x_1,y_1,-z_1]+P[x_2,y_2,z_2]-P[x_1,y_1,z_1]$$

$$B'=P[x_2,y_2,-z_2]-P[x_1,y_1,-z_1]$$

where $C_{t0}$ is the tip capacitance in vacuum. Finally, the change in the tip capacitance due to the dielectric sample is provided by:

$$\Delta\left(\frac{1}{C}\right) = \frac{1}{C_t} - \frac{1}{C_{t0}} = \gamma A' + \gamma^2 B' \qquad (6)$$

Probe resonant frequency is an essential part of the complex permittivity measurements. Consider a probe comprised of a piece of transmission line with uniform characteristic impedance $Z_0$, which open end is connected to the tip with the fringe impedance $Z_t=1/i\omega C_t$, where $1/C_t$ is given by Eq. (5). Since the tip capacitance is small ($\omega Z_0 C_t \ll 1$), this structure forms nearly a quarter-lambda (quarter-wavelength) or half-lambda (half-wavelength) resonator depending on whether the other end is short or open, respectively. Also, in order to form a resonant near-field probe the tip can be connected to the lumped-element circuit (such as an LC-contour), static resonator, etc. In the general case the resonant condition of the probe is developed as follows:

$$\frac{1}{i\omega C} = i\omega L_{eff}(\omega)$$

where $i\omega L_{eff}(\omega)$ is the effective impedance of the resonator at the tip plane looking into the resonator, and $L_{eff}(\omega)$ is the effective frequency dependent inductance of the resonator near the perfectly open resonant frequency. Since the tip capacitance is small measurement of small changes in the resonant frequency and may be made using a linear expansion for $\omega L_{eff}(\omega)$ in the frequency operating range, which yields for change in the resonant frequency due to change in the tip capacitance:

$$\Delta\left(\frac{1}{C}\right) = \alpha \Delta \omega \tag{7}$$

where
$\alpha = 3\omega_0^2 L_0 + \beta \omega_0^2$
$L_0 = L_{eff}(\omega_0)$ $$\beta = \left.\frac{\delta L_{eff}}{\delta \omega}\right|_{\omega=\omega_0}$$

Here $\omega_0$ is the probe resonant frequency with no sample present. Eqs. (6) and (7) finally yield for the relative resonant frequency shift $\delta f$:

$$\delta f = \frac{f_e - f_{res}}{f_e} = \gamma A + \gamma^2 B \tag{8}$$

where $A=A'/\alpha f_e$ and $B=B'/\alpha f_e$ are the two unknown coefficients to be calibrated for. In order to determine them, two standard samples are necessary. The air with $\in_r=1$ and $\gamma=0$ cannot be used since $f_e$ is employed as a "reference" frequency. Therefore, two dielectrics with known dielectric constants $\in_{r1} \neq \in_{r2} \neq 1$ are necessary. By measuring them, one can find the coefficients in (8) for a given tip-to-sample separation d*:

$$A[d^*] = \frac{-\delta f_1 (\varepsilon_{r1}+1)^2(\varepsilon_{r2}-1)^2 + \delta f_2(\varepsilon_{r1}-1)^2(\varepsilon_{r2}+1)^2}{2(\varepsilon_{r1}-\varepsilon_{r2})(\varepsilon_{r1}-1)(\varepsilon_{r2}-1)} \tag{9}$$

$$B[d^*] = \frac{(\varepsilon_{r1}+1)(\varepsilon_{r2}+1)(\delta f_1(\varepsilon_{r1}+1)(\varepsilon_{r2}-1)-\delta f_2(\varepsilon_{r1}-1)(\varepsilon_{r2}+1))}{2(\varepsilon_{r1}-\varepsilon_{r2})(\varepsilon_{r1}-1)(\varepsilon_{r2}-1)}$$

where $\delta f_1$ and $\delta f_2$ are the relative frequency shifts for $\in_{r1}$ and $\in_{r2}$, respectively measured at d=d*. In the case when more than two standard samples are available Eq. (8) has to be fit to the results of calibration measurements, using A and B as the fitting parameters.

Now Eq. (8) is to be generalized for the case of low loss dielectric sample with complex dielectric permittivity $\in = \in' - i\in'' = \in'(1-i \tan \delta$, $\tan \delta \ll 1$. Substitution of complex angular frequencies $\omega_e = \omega_e' + i\omega_e''$ and $\omega_{res} = \omega_{res}' + i\omega_{res}''$ and complex dielectric permittivity into Eq. (8), and further separation of real and imaginary parts yields:

$$\frac{\Delta \omega}{\omega} = \frac{\omega_e' - \omega_{res}'}{\omega_e'} = \gamma' A + \gamma'^2 B \tag{10}$$

$$\Delta \frac{1}{Q} = \frac{1}{Q} - \frac{1}{Q} = -2\gamma''(A + 2\gamma' B) \tag{11}$$

where $$\gamma' = \frac{\varepsilon'-1}{\varepsilon'+1}$$

$$\gamma'' = \frac{2\varepsilon' \tan \delta}{(\varepsilon'+1)^2} \tag{12}$$

The same coefficients A and B appear in both Eq. (10) for the resonant frequency and Eq. (11) for the Q-factor. Therefore, Eq. (11) may be employed to measure sample's dielectric losses, while using the calibration procedure described above to determine A and B.

Measurement of the Q-factor using FFS is based on the following theory:

the power, $P_r$, reflected back from a resonator coupled to a transmission line (or a waveguide) is given by the Eq. (13).

$$P_r = P_{in}\left(1 - \frac{4\beta}{(1+\xi^2)(1+\beta)^2}\right) \tag{13}$$

$$\xi = \frac{\omega - (1+\alpha)\omega_u'}{(1+\beta)\omega_u''}$$

where $P_{in}$ is the incident power, $\omega = 2\pi f$ if the angular frequency, $\beta$ is the coupling coefficient, $\alpha = (\omega' - \omega_u')/\omega_u'$ where $\omega'$ and $\omega_u'$ are the angular resonant frequencies of the loaded and unloaded (e.g., without coupling) resonators, respectively, and $\omega_u'' = \omega_u'/2Q_u$ where $Q_u$ is the unloaded Q-factor.

Eq. (13) describes an ideal situation, while in practice the measurement of the reflection coefficient $\Gamma = P_r/P_i$ is always a subject to the presence of some unwanted background, which in many cases can be approximated by a quadratic polynomial:

$$\Gamma = a + b(\omega - \omega') + c(\omega - \omega')^2 + \frac{4\beta \omega''^2}{(1+\beta)^2(\omega''^2 + (\omega - \omega')^2)} \tag{14}$$

where a, b and c are the polynomial coefficients, and $\omega'' = \omega'/2Q$ where Q is the loaded Q-factor.

It can be shown that if the frequency modulator swing in the FFS technique is less than one tenth of the resonator bandwidth than the X (or Y) output of the lock-in amplifier is proportional to the derivative $\partial \Gamma / \partial \omega$.

$$X = G\frac{\partial \Gamma}{\partial \omega} = G\left[b + 2c(\omega - \omega') + \frac{8\beta(\omega - \omega')\omega''^2}{(1+\beta)^2((\omega - \omega')^2 + \omega''^2)^2}\right] \tag{15}$$

where G is the total gain in the system. However, it is more practical to measure the magnitude $R = (X^2 + Y^2)^{1/2}$, which unlike X and Y, is independent of the phase drift of the lock-in amplifier. Substitution of $\omega' = 2\pi f_{res}$ and $\omega'' = \pi f_{res}/Q$ into (3a) finally yields for R:

$$R(f) = \qquad (16)$$
$$G\left\{\left[2\pi b + 8\pi^2 c(f - f_{res}) + \frac{32\beta(f - f_{res})f_{res}^2 Q^2}{(1+\beta)^2(f_{res}^2 + 4(f - f_{res})^2 Q^2)^2}\right]^2\right\}^{1/2}$$

In order to determine the Q-factor from the FFS measurements, the IF voltage (e.g. R) is measured vs. frequency using the FFS routine. In order to reliably extract the Q-factor from the measurements, the sweep span has to be greater than the resonator bandwidth divided by $\sqrt{3}$. Using the non-linear approach, the R(f) is fitted to the Eq. (16), using G,b,c,$f_{res}$,Q and β as the free parameters.

For probes with geometry other than the quarter-lambda described in previous paragraphs (e.g., half-lambda), relations similar to Eq. (10) and Eq. (11) may be attained.

In this manner, the geometrical coefficients A and B are calculated which are further used in measuring the dielectric constant $\in_{rs}$ of the sample under study as described supra with regard to the algorithm for quantitative measurement of dielectric constant of the present invention.

Figure 4:
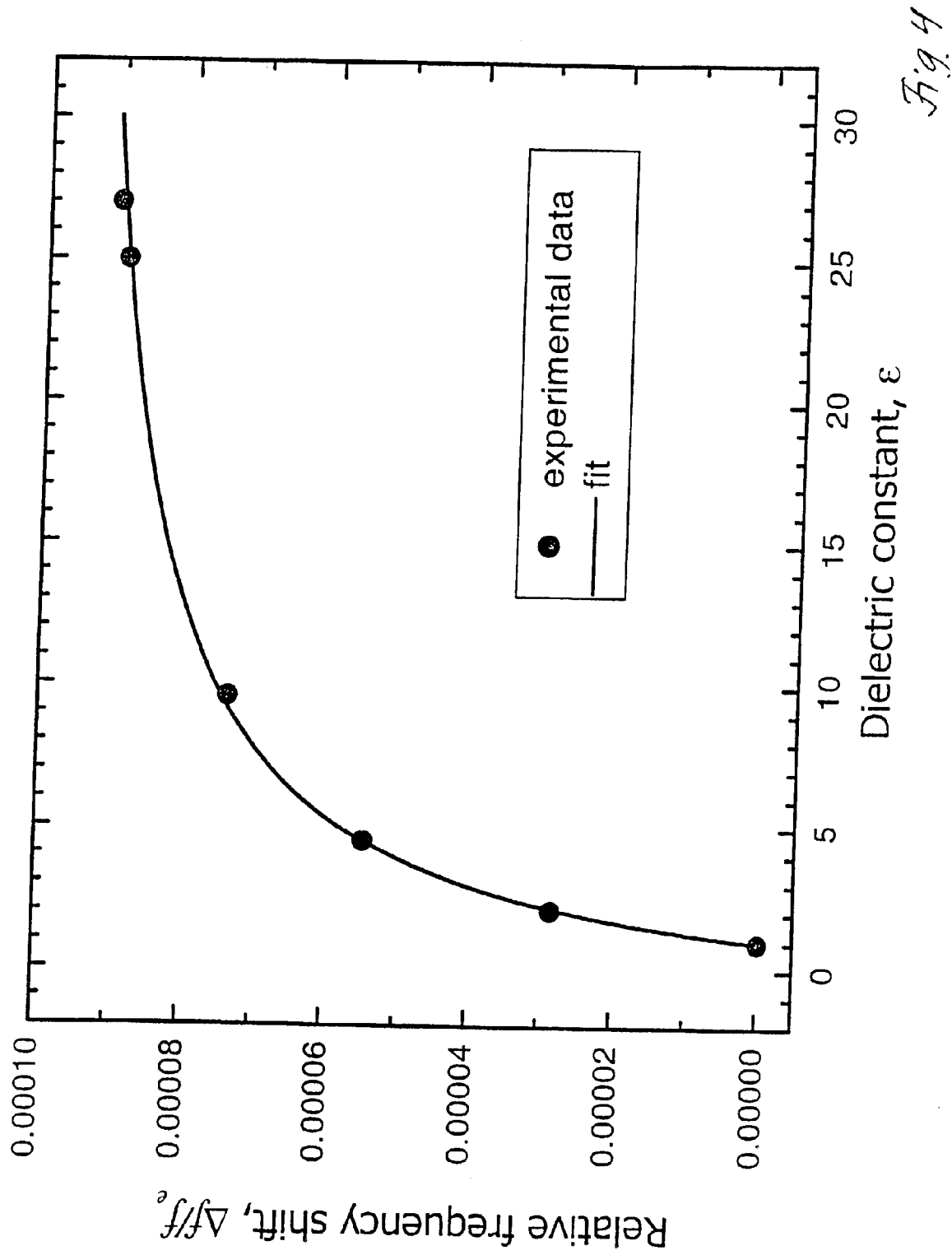
FIG. 4 is a diagram illustrating relative frequency shift vs. dielectric constant and representing the experimental results and the fitting procedure applied thereto (the tip-to-sample separation is maintained at a predetermined value by the shear force distance control mechanism of the present invention)

FIG. 4 shows the results of the above-described procedure applied to the two-wire probe with 20 μm tip aperture. The tip-to-sample separation is maintained by the shear force distance control mechanism 36 of the present invention. The solid circles on the diagram of FIG. 4 represent the measurements of a few samples with known dielectric constants: air ($\in_{r1}$=1), Teflon ($\in_{r2}$=2.1), SiO$_2$ ($\in_{r3}$=4.5), MgO ($\in_{r4}$=9.6), LaAlO$_3$ ($\in_{r5}$=25), and Yttria Stabilized Zirconia (YSZ) ($\in_{r6}$=27). The solid line of the diagram of FIG. 4 represents a fit to Eq. (8).

In the system of the present invention, a new technique for precise measurements of frequency shift is used. Since the small tips 20 have very small capacitance $C_t \sim \in_0 \alpha_t$, wherein the $\alpha_t$ is the characteristic tip size, they produce very small relative resonant frequency shift of the probe 10. Therefore, a very precise frequency shift measurement technique is required in order to perform quantitative measurements. The method for measurement of the resonant frequency and Q factor of the present invention is accurate, precise, fast, and does not require an expensive Network Analyzer. This method is based on a lock-in based measurement of the absolute value of the first derivative of the power either reflected from or transmitted through the resonator 26 as a function of frequency. Two embodiments of the technique are envisioned in the scope of the present invention.

Figure 5:
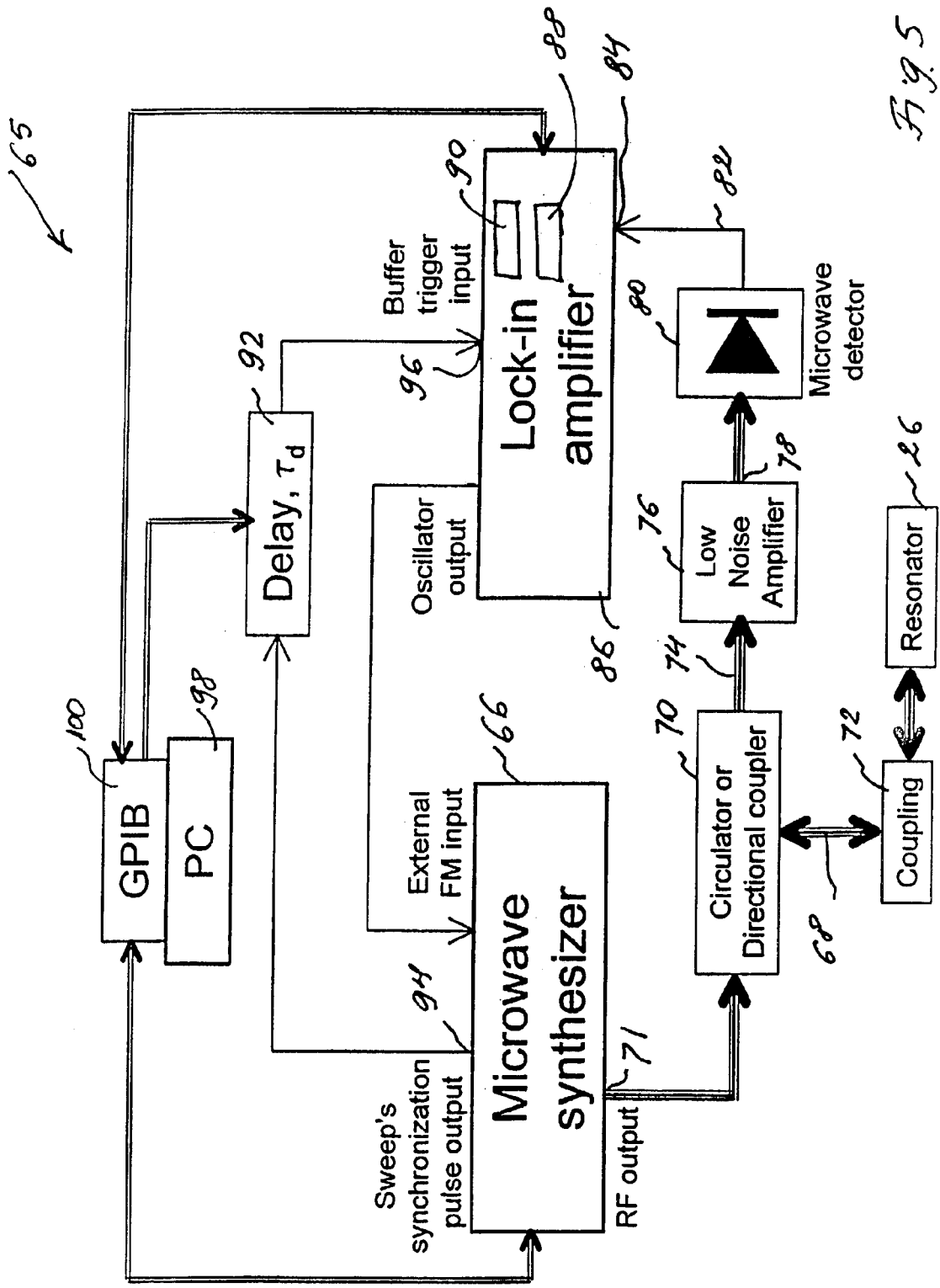
FIG. 5 is a block diagram of the apparatus for the fast frequency sweep (FFS) technique for precise measurement of frequency shift.

Shown in FIG. 5, is a block diagram of one embodiment of the fast frequency sweep technique of the present invention for measurement of frequency shift. As shown in FIG. 5, the set-up for frequency shift measurement 65, which is a part of the measurement electronics 34 (best shown in FIG. 1), includes a microwave synthesizer 66 for generating an RF signal. A portion 68 of the signal is fed to a resonator 26 through a circulator (or directional coupler) 70 and a coupling 72. The signal 74 that is reflected from the resonator 26 is coupled to a low-noise amplifier. The output 78 of the low-noise amplifier 76 is coupled to a microwave detector 80, generating an output signal 82 which is fed to the input 84 of a lock-in amplifier 86. The microwave synthesizer 66 is a synthesized sweeper, such as AGILENT 83752. The lock-in amplifier 86 (such as Perkin-Elmer 7280) has a digital signal processing unit 88 and internal buffer 90 for data storage.

A delay circuit 92 is coupled between the sweep's synchronization pulse output 94 of the microwave synthesizer 66 and the buffer trigger input 96 of the lock-in amplifier 86.

The delay circuit 92 is based on a Programmable Integrated Circuit such as Altera-EPM 7064SLC44-10.

The set-up for the frequency shift measurements further includes a personal computer 98 with a GPIB interface 100 which is part of the data processor 35 shown in FIG. 1.

The microwave portion of the setup 65 provides for a conventional measurement of the microwave power either reflected from or transmitted through the resonator 26. The low-noise microwave amplifier 76 (with typical noise~1 dB) provides for improved S/N ratio at the output of the microwave detector 80.

The microwave synthesizer 66 operates in the synthesized step (digital) sweep mode. The microwave output 71 is frequency modulated by using either internal or external frequency modulation (FM):

$$f_{FM} = f_0 + \Delta f \sin[\Omega_{FM} t]$$

where $f_0$ is the particular frequency; $\Delta f$ is the swing of the frequency modulation from 1 kHz up to 100 MHz; $\Omega_{FM}$ is the modulation frequency in the range of 50 to 500 kHz, and t is the time.

In the case of internal modulation, $\Omega_{FM}$ serves also as an external reference for the lock-in amplifier 86. In the case of external modulation, $\Omega_{FM}$ is the reference frequency of the lock-in.

While in the FM mode, the microwave synthesizer 66 performs a digital (step) frequency sweep through the resonant frequency with a span from 1 kHz up to 100 MHz and the first harmonic (1F) voltage at the microwave detector 80 is measured by the lock-in amplifier 86. In the case where Δf is much less than the resonator bandwidth, such provides for measurements of the derivative for the power either reflected from or transmitted through the resonator 26. The frequency sweep is externally initiated via the GPIB interface 100 or through an external trigger. The sweep dwell time per point may be from on the order of 0.01 ms up to a few seconds.

The synchronization between the microwave synthesizer 66 and the lock-in amplifier 86 is achieved by externally triggering the lock-in amplifier 86 to acquire one data point (1F voltage) for each microwave frequency during the sweep. To speed up the actual measurement, the sampled 1F Voltages are stored in the internal data buffer 90 of the lock-in amplifier 86. The lock-in amplifier 86 is directly triggered by the delay circuit 92 which in turn is triggered by the microwave source synch-pulse fed to the delay circuit 92 from the output 94 of the microwave synthesizer 66.

Figure 6:
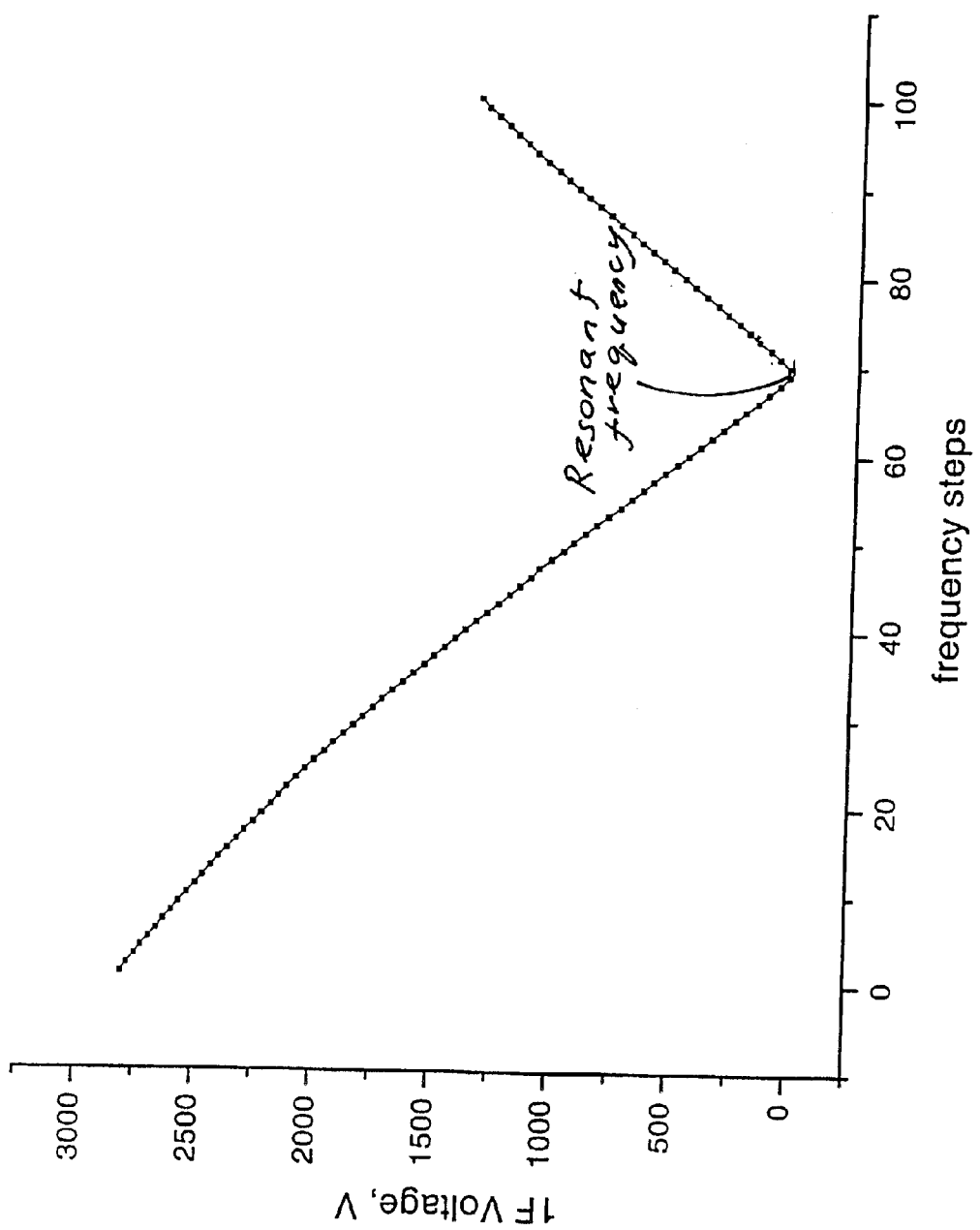
FIG. 6 is a trace diagram of a lock-in output vs. frequency steps of the fast frequency sweep (FFS) apparatus with the synchronization circuit shown in FIG. 5.

Once the sweep is finished, the data points (1F voltage) are retrieved from the lock-in data buffer 90 to the PC 98 via GPIB 100 interface and analyzed, as described infra to extract the resonant frequency and the Q-factor. The typical curve obtained in the set-up 65 of FIG. 5 is shown in FIG. 6 illustrating the voltage vs. frequency steps diagram.

Figure 7:
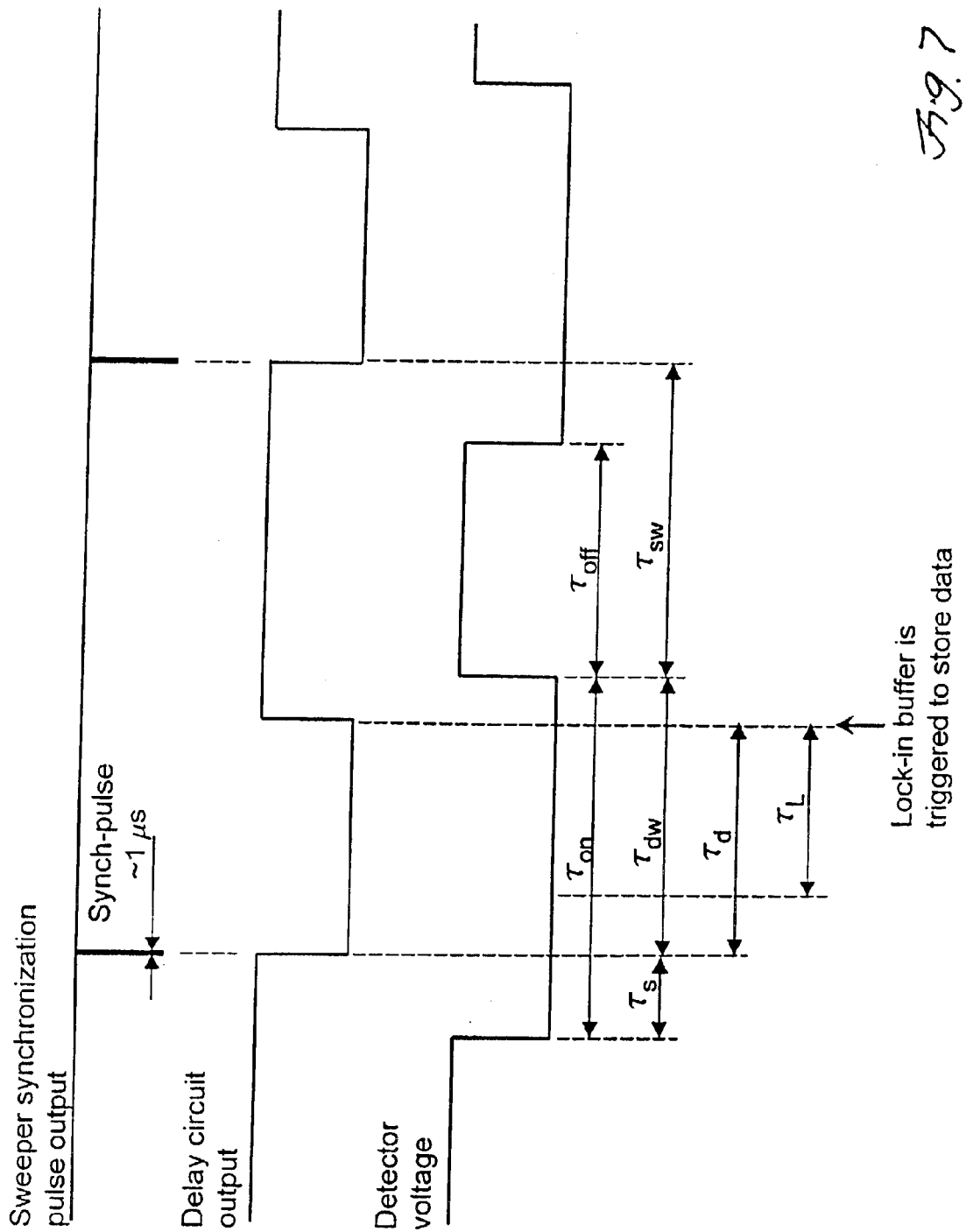
FIG. 7 is a timing diagram of the sweeper synchronization pulse output, delay circuit output, and detector voltage of the apparatus of FIG. 5.

The timing diagram illustrated in FIG. 7, indicates the following times:

$\tau_{on}$—microwave power is ON
$\tau_{off}$—microwave power is OFF
$\tau_s$—settling time of the microwave synthesizer 66
$\tau_{dw}$—dwell time, ~1 ms to 1 s
$\tau_{sw}$—switching time, ~1–12 ms depending on the microwave synthesizer and operating frequency
$\tau_d$—delay time
$\tau_L$—lock-in time constant.

The following timing conditions are to be met for proper operation of the set up of FIG. 5:

$\tau_L < \tau_{dw}$
$\tau_L < \tau_d$ $\tau_d < \tau_{dw}$
$\tau_L >> 1/\Omega_{FM}$.
Where $\Omega_{FM}$ is the reference frequency of the lock-in.

The overall sweep time is equal to (Number of points)×(Dwell time+Switching time) and for 100 points sweep is on the order of a few hundred milliseconds for modern microwave sweepers.

With regard to data analysis, the resonant frequency, $f_{res}$, is determined by means of one or some combination of the following numerical techniques applied to the diagram shown in FIG. 6:

(a) determining the relative resonant frequency as the frequency at the point of the measured frequency curve wherein on the fitting curve of the measured power vs. frequency the frequency is a minimum; or (b) determining the relative resonant frequency as the frequency at the point of said measured curve where the first derivative of the measured power with respect to frequency equals zero and second derivative of the measured power is positive;

(c) fitting the obtained trace curve to an even order ($2^{nd}$ or higher) polynomial, and finding the frequency where the first derivative of this polynomial equals to zero; and (d) fitting the measured curve to the equation;

$$R(f) = G \left\{ \left[ 2\pi b + 8\pi^2 c(f - f_{res}) + \frac{32\beta(f - f_{res})f_{res}^2 Q^2}{(1+\beta)^2(f_{res}^2 + 4(f - f_{res})^2 Q^2)} \right]^2 \right\}^{1/2}, \text{ and}$$

finding $f_{res}$ as the free fit parameter, wherein:

R(f) is the magnitude of the measured signal;
G is the total gain in the resonator;
b and c are polynomial coefficients;
β is the coupling coefficient; and
Q Is the loaded Q-factor.

In determining the Q-factor change Δ(1/Q), the measured FFS trace R(f) measured for the empty resonator and the loaded with the unknown sample resonator are fitted into the Eq (16) and respective Q-factor is found as one of the free fit parameters.

Figure 8:
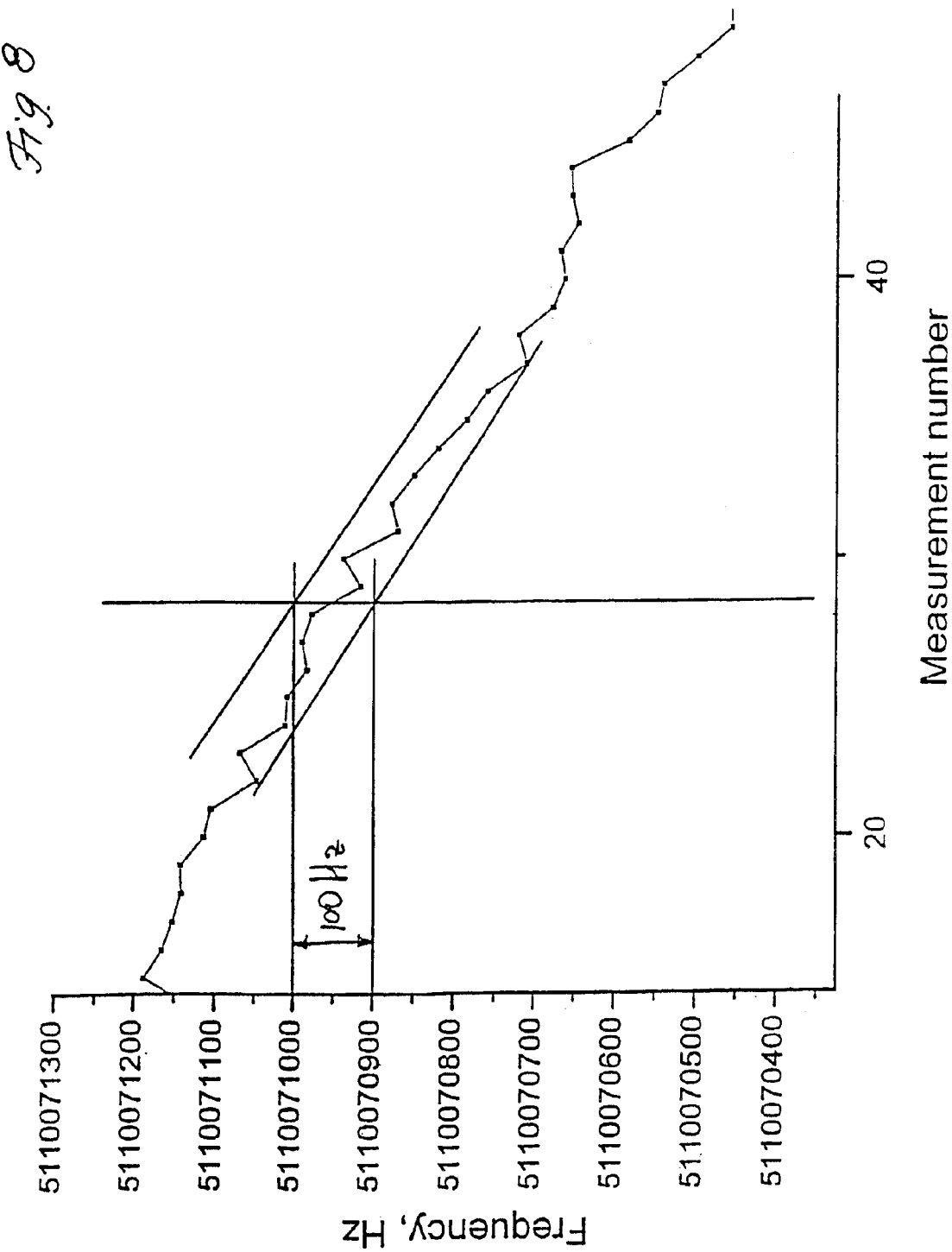
FIG. 8 is a diagram showing an example of the resonant frequency measured over a predetermined period of time for the resonator with the resonant frequency approximately 5 GHz and the Q factor approximately 500; and, FIG. 9 is a block diagram of alternative embodiment of the apparatus for fast frequency sweep (FFS) technique of the present invention.

Using these techniques, the precision in frequency determination is between $10^{-7}$ and $10^{-8}$ for resonators with a Q-factor ranging from 100 to 1000. FIG. 8 shows an example of the resonant frequency being measured over a certain period of time for the resonator with resonant frequency ~5 GHz and Q-factor ~500. The overall drift of the resonance frequency vs. time is due to the thermal drift of the resonator properties (dimensions, dielectric constant). The precision achieved is better than 100 Hz.

Figure 9:
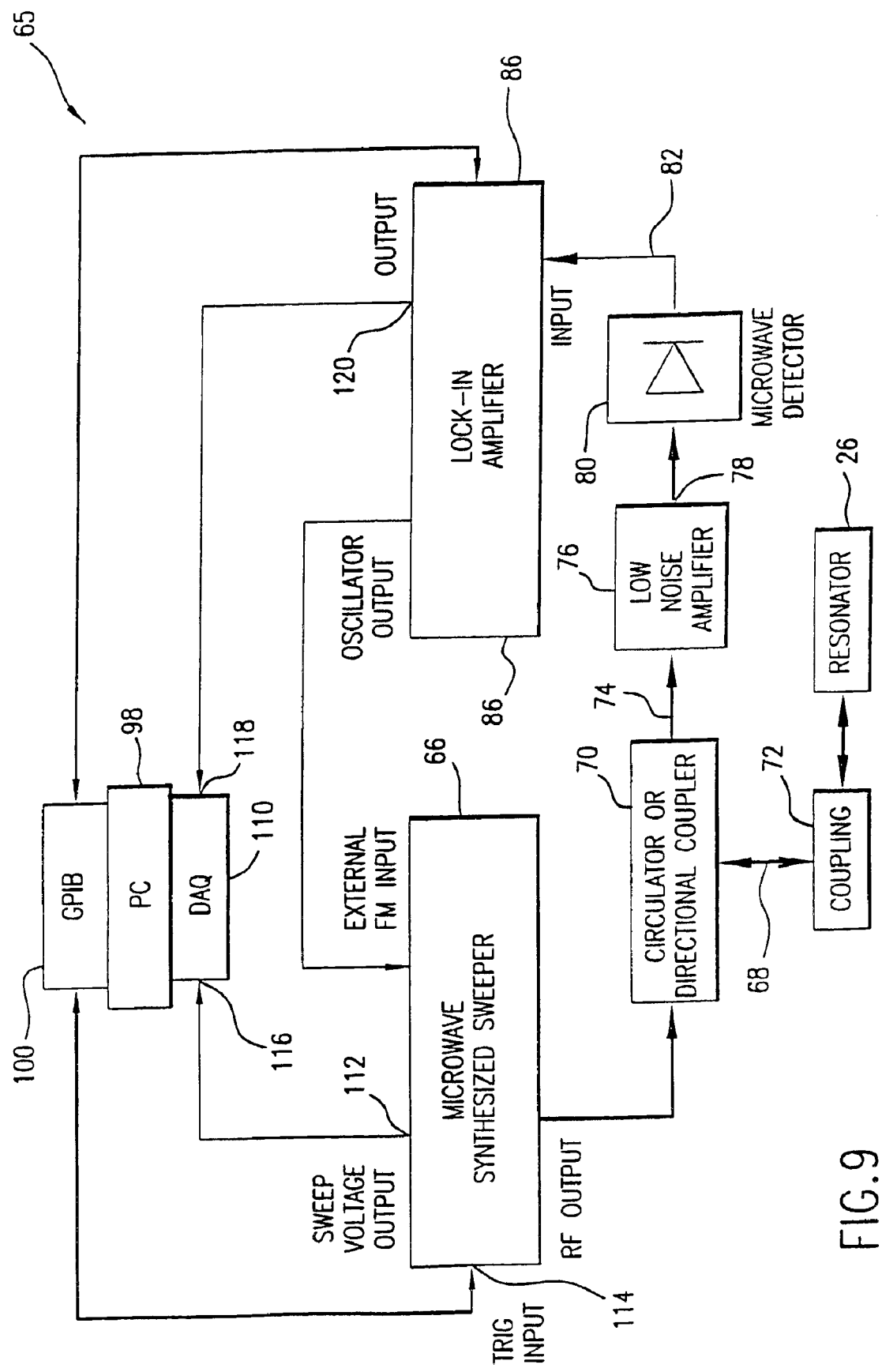

FIG. 9 shows the block diagram for the alternative embodiment of the FFS set-up for the frequency shift measurements. In this embodiment, the microwave source 66 is a synthesized sweeper such as AGILENT 83752, or some like mechanism. The lock-in amplifier 86 is Perkin Elmer 7280 DSP, or some like system. Personal computer 98 has a GPIB interface 100, with a DAQ card 110. The microwave portion of the setup provides for a conventional measurement of the microwave power either reflected from or transmitted through the resonator under study. The low-noise microwave amplifier 76 (with typical noise figure~1 dB) is placed at the input of the microwave detector 80 which provides for improved S/N ratio at the detector output.

Unlike the embodiment shown in FIG. 5, the microwave source 66 in the embodiment of FIG. 9 operates in the synthesized analog sweep mode. The advantage of using this mode is that the frequency continuously changes, and the sweep time may be as fast as 10 ms, while the microwave source 66 is still operating in the synthesized regime. In this mode of operation, the microwave source 66 outputs at the output 112 a voltage proportional to the frequency ranging from 0 V at start of the sweep to +10V at the sweep end, regardless of sweep width. The typical voltage accuracy is ±0.05% (or ±5 mV) into a high impedance load. Assuming a sweep span on the order of 100 kHz, the frequency accuracy will be ±50 Hz, which is better than the targeted precision of ±100 Hz for the FFS measurement.

The microwave output is frequency modulated by using either internal or external modulation source:

$$f_{FM} = f_0 + \Delta f \sin[\Omega_{FM} t]$$

where $f_0$ is the particular frequency, Δf is the swing of the frequency modulation from 1 kHz up to 100 MHz, $\Omega_{FM}$ is the modulation frequency in the range from 50 to 500 kHz, and t is the time. In the case of internal modulation, $\Omega_{FM}$ serves as an external reference for the lock-in amplifier 86. In the case of external FM, $\Omega_{FM}$ is the reference frequency of the lock-in amplifier 86. While in the FM mode, the microwave source 66 performs an analog frequency sweep through the resonant frequency with a span from 1 kHz up to 100 MHz and the first harmonic (1F) voltage at the microwave detector 80 is measured by the lock-in amplifier 86. In the case where Δf is much less than the resonator bandwidth, the measurement is the derivative of the power either reflected from or transmitted through the resonator 26. The frequency sweep is externally initiated via the GPIB interface 100 or external triggering may be used through the input 114 of the microwave source 66.

Both the lock-in 1F voltage and the source sweep outputs are simultaneously sampled by the DAQ card 110. Once the sweep is finished, the dependence of 1F voltage vs. sweep output voltage is analyzed as described in the following paragraphs in order to extract resonant frequency.

With regard to FIG. 9, the procedure of taking measurements is as follows:

1. The processor 35 (shown in FIG. 1), which is part of the PC 98 actuates the DAQ card 110 to send out a TTL pulse to trigger the microwave source 66 and immediately starts data acquisition at the inputs 116 and 118 of the DAQ card 110.

2. Once the microwave source 66 is triggered, it starts to execute the analog sweep with predetermined parameters. Simultaneously, the DAQ card 110 measures R at the output 120 of the lock-in amplifier 86 and sweep out voltage at the output 112 of the microwave source 66. Although it is not of essential importance, it is preferred that the DAQ card 100 begins taking data with little delay (smaller than sweep time) when the sweep is actually started. For the minimum sweep time 10 ms, the delay should be smaller or equal to 100 microseconds.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is claimed is:

1. A method for measurement of a material's complex permittivity, comprising the step of:

positioning a near-field microwave probe at a predetermined distance d* from a first standard sample having a dielectric constant $\in_{r1}$;

measuring a relative resonant frequency shift $\delta f_1 = (f_e - f_1)/f_e$ of said near-field microwave probe for said first standard sample;

positioning said near-field microwave probe said predetermined distance d* from at least one second standard sample having a dielectric constant $\in_{r2}$;

measuring a relative resonant frequency shift $\delta f_2 = (f_e - f_2)/f_e$ of said near-field microwave probe for said at least one second standard sample, wherein $f_1$ and $f_2$ are the resonant frequencies of said probe positioned said distance d* from said first and said at least one second standard samples, respectively, and $f_e$ is the resonator frequency of said probe for an empty resonator;

calculating geometrical coefficients A and B using said measured relative resonant frequencies $\delta f_1$ and $\delta f_2$ and dielectric constants $\in_{r1}$ and $\in_{r2}$ for said first and at least one second standard samples;

positioning and maintaining said near-field microwave probe said distance d* from a sample under study;

measuring a relative resonant frequency shift $\delta f_s = (f_e - f_s)/f_e$ of said near-field microwave probe for said sample under study;

measuring a change in the quality factor $\Delta(1/Q)$ of said near-field microwave probe for the resonator loaded with said sample under study and for an empty resonator;

calculating the dielectric constant of said sample under study using said resonant frequency shift $\delta f_s$ and said geometrical coefficients A and B; and calculating the dielectric loss tangent (tan $\delta$) of said sample under study using said $\Delta(1/Q)$ and said geometrical coefficients A and B.

2. The method of claim 1, further comprising the steps of:

maintaining said distance d* between said near-field microwave probe and said sample under study by a shear force-based distance control mechanism.

3. The method of claim 1, further comprising the step of measuring by a fast frequency sweep (FFS) technique based on lock-in amplifier-based measurements of a power reflected from said near-field probe as a function of a frequency of a signal applied thereto a quality factor change $\Delta(1/Q) = 1/Q_e - 1/Q$, wherein $Q_e$ and Q are quality factors for the empty resonator and the resonator loaded with said sample under study, respectively.

4. The method of claim 1, wherein said geometrical coefficients A and B are calculated as:

$$A[d^*] = \frac{-\delta f_1(\varepsilon_{r1}+1)^2(\varepsilon_{r2}-1)^2 + \delta f_2(\varepsilon_{r1}-1)^2(\varepsilon_{r2}+1)^2}{2(\varepsilon_{r1}-\varepsilon_{r2})(\varepsilon_{r1}-1)(\varepsilon_{r2}-1)}$$

$$B[d^*] = \frac{(\varepsilon_{r1}+1)(\varepsilon_{r2}+1)(\delta f_1(\varepsilon_{r1}+1)(\varepsilon_{r2}-1) - \delta f_2(\varepsilon_{r1}-1)(\varepsilon_{r2}+1))}{2(\varepsilon_{r1}-\varepsilon_{r2})(\varepsilon_{r1}-1)(\varepsilon_{r2}-1)}.$$

5. The method of claim 1, further comprising the step of:

providing n standard samples wherein n>2, each having a respective dielectric constant $\in_{rn}$;

positioning said near-field microwave probe said predetermined distance d* from each of said n standard samples;

measuring a relative resonant frequency shift $\delta f_n = (f_e - f_n)/f_e$ of said near-field microwave probe for each said nth standard sample, wherein $f_n$ is the resonant frequency of said probe positioned said distance d* from said nth standard sample, respectively, and $f_e$ is the resonator frequency of said probe for an empty resonator; and determining geometrical coefficients A and B by fitting said dielectric constants $\in_{rn}$ and said relative resonant frequency shift $\delta f_n$ of each said nth standard sample into the formula:

$$\delta f_n = \gamma A + \gamma^2 B$$

where $\gamma = (\in_{rn} - 1)/(\in_{rn} + 1)$.

6. The method of claim 1, wherein said dielectric constant $\in_{rs}$ of the sample under study is calculated as:

$$\varepsilon_{rs} = \frac{\delta f_s + B[d^*] + \sqrt{A[d^*]^2 + 4\delta f_s B[d^*]}}{A[d^*] + B[d^*] - \delta f_s}.$$

7. The method of claim 1, wherein said dielectric loss tangent (tan $\delta$) of said sample under study is calculated as:

$$\tan\delta = -\Delta\left(\frac{1}{Q}\right)\frac{(\varepsilon_{rs}+1)^3}{4\varepsilon_{rs}(2B[d^*](\varepsilon_{rs}-1) + A[d^*](\varepsilon_{rs}+1))}$$

wherein a quality factor change $$\Delta\left(\frac{1}{Q}\right) = \frac{1}{Q_e} - \frac{1}{Q},$$

Q and $Q_e$ are quality factors for the resonator loaded with said sample under study and the empty resonator, respectively, A and B are geometrical coefficients, and $\in_{rs}$ is a dielectric constant of the sample under study.

8. The method of claim 1, wherein said near-field microwave probe includes a balanced two-conductor transmission line resonator.

9. The method of claim 1, wherein said near-field microwave probe includes a coaxial transmission line resonator.

10. The method of claim 1, further comprising the steps of:

measuring said relative resonant frequency shift $\delta f_s$ of said near-field probe for said sample under study by a fast frequency sweep (FFS) technique based on lock-in amplifier-based measurements of the absolute value of the first derivative of a power reflected from or transmitted through said near-field probe as a function of a frequency of a signal applied thereto.

11. The method of claim 10, further comprising the steps of:

determining the resonant frequency $f_{res}$ by a numerical technique chosen from the group of numerical techniques consisting of:

(a) determining the resonant frequency $f_{res}$ as the frequency at the point on said measured curve where said measured curve has a minimum;

(b) determining the resonant frequency $f_{res}$ as the frequency at the point of said measured curve where the first derivative of the measured power with respect to frequency equals zero and second derivative of the measured power is positive;

(c) fitting the obtained trace curve to an even order polynomial, and finding the frequency where the first derivative of said polynomial equals to zero; and (d) fitting said measured curve to $$R(f) = G\left\{\left[2\pi b + 8\pi^2 c(f - f_{res}) + \frac{32\beta(f - f_{res})f_{res}^2 Q^2}{(1+\beta)^2(f_{res}^2 + 4(f - f_{res})^2 Q^2)^2}\right]^2\right\}^{1/2},$$

and finding the $f_{res}$ as the free fit parameter, wherein:

R(f) is the magnitude of the measured signal;

G s the total gain in the resonator;

b and c are polynomial coefficients;

$\beta$ is the coupling coefficient; and

Q Is the loaded Q-factor.

12. The method of claim 10, further comprising the steps of:

determining a resonant sweep voltage output by a microwave source and converting said resonant sweep voltage into the resonance frequency $f_{res}$.

13. The method of claim 3, further comprising the steps of:

determining said $\Delta(1/Q)$ using the fitting of the measured FFS trace to $$R(f) = G\left\{\left[2\pi b + 8\pi^2 c(f - f_{res}) + \frac{32\beta(f - f_{res})f_{res}^2 Q^2}{(1+\beta)^2(f_{res}^2 + 4(f - f_{res})^2 Q^2)^2}\right]^2\right\}^{1/2}$$

wherein:

R(f) is the magnitude of the measured signal;

G is the total gain in the resonator;

b and c are polynomial coefficients;

$\beta$ is the coupling coefficient; and

Q Is the loaded Q-factor and finding said $Q_e$ and Q as free fit parameters.

14. A system for measuring a material's complex permittivity, comprising:

a sample under study, a near-field microwave probe having a tip, a shear force based distance control unit operatively coupled to said near-field microwave probe to control tip-to-sample separation, processing means for calculating the complex permittivity of the sample under study, and calibration means operatively coupled to said near-field microwave probe and to said processing means for calculating calibration coefficients, wherein said calibration means includes at least two standard samples, said distance control unit positioning said near-field microwave probe a predetermined distance from each of said standard samples, means for measuring relative resonance frequency shifts of said near-field probe for each of said standard samples, and processing means for calculating said calibration coefficients A and B, where:

$$A[d^*] = \frac{-\delta f_1(\varepsilon_{r1} + 1)^2(\varepsilon_{r2} - 1)^2 + \delta f_2(\varepsilon_{r1} - 1)(\varepsilon_{r2} + 1))}{2(\varepsilon_{r1} - \varepsilon_{r2})(\varepsilon_{r1} - 1)(\varepsilon_{r2} - 1)}$$

$$B[d^*] = \frac{(\varepsilon_{r1} + 1)(\varepsilon_{r2} + 1)(\delta f_1(\varepsilon_{r1} - 1) - \delta f_2(\varepsilon_{r1} - 1)(\varepsilon_{r2} + 1))}{2(\varepsilon_{r1} - \varepsilon_{r2})(\varepsilon_{r1} - 1)(\varepsilon_{r2} - 1)}$$

wherein d* is the distance between the tip of the probe and each of said at least two standard samples, $\delta f_1 = (f_e - f_1)/f_e$ and $\delta f_2 = (f_e - f_2)/f_e$, $f_1$ and f2 are the resonant frequencies measured at tip-to-sample separation d*, $f_e$ is the resonant frequency of the empty resonator, and $\in_{r1}$ and $\in_{r2}$ are dielectric constants of said at least two standard samples, respectively.

15. The system as recited in claim 14, wherein said distance control unit includes:

an oscillating unit coupled to said probe to excite oscillations in said tip of the probe, a movable stage operatively coupled to said probe, a laser generating a laser beam directed to said tip of the probe, a photodetector receiving said laser beam affected by the oscillations of said tip of the probe, said photodetector outputting a signal corresponding to changes of the oscillation parameters of said tip of the probe, a lock-in amplifier for receiving said signal from said photodetector and issuing an oscillator output signal and a control output signal responsive thereto, said oscillator output signal being coupled to said oscillating unit, and said control output signal being coupled to said stage to move the stage in a predetermined direction to control the tip-to-sample separation.

16. The system as recited in claim 14, further comprising:

means for measuring a relative resonant frequency shift of said near-field microwave probe for said sample under study by fast frequency sweep technique.

17. The system as recited in claim 16, further comprising means for lock-in measurements of the absolute value of the first derivative of the power reflected from or transmitted through said probe as a function of the frequency of the signal applied to said probe.

18. The system as recited in claim 14, further comprising:

means for measuring a change in the quality factor $\Delta(1/Q)$ of said near-field microwave probe for the resonator loaded with said sample under study and an empty resonator.

19. The system as recited in claim 14, wherein said near-field microwave probe includes a balanced two-conductor transmission line resonator, including at least a pair of conductors extending in spaced relationship therebetween and spaced by a dielectric media.

20. The system as recited in claim 14, wherein said processing means for calculating the complex permittivity calculates a dielectric constant $\in_{rs}$ of said sample under study, where:

$$\varepsilon_{rs} = \frac{\delta f_s + B[d^*] + \sqrt{A[d^*]^2 + 4\delta f_s B[d^*]}}{A[d^*] + B[d^*] - \delta f_s}$$

wherein $f_s$ is a relative resonant frequency shift of said probe for said sample under study.

21. The system as recited in claim 20, wherein said processing means for calculating the complex permittivity calculates a dielectric loss tangent (tan δ) of said sample under study where:

$$\tan\delta = -\Delta\left(\frac{1}{Q}\right)\frac{(\varepsilon_{rs}+1)^3}{4\varepsilon_{rs}(2B[d^*](\varepsilon_{rs}-1)+A[d^*](\varepsilon_{rs}+1))}$$

wherein a quality factor change $$\Delta\left(\frac{1}{Q}\right) = \frac{1}{Q_e} - \frac{1}{Q},$$

$Q$ and $Q_e$ are quality factors for the resonator loaded with said sample under study and the empty resonator, respectively.

* * * * *